J. W. MILAM.
TAKE-UP FOR FLEXIBLE SUSPENSORIES.
APPLICATION FILED NOV. 12, 1908.

980,319.

Patented Jan. 3, 1911.

Witnesses
J.G. Hinkel
J.J. McCarthy

Inventor
John W. Milam
By Foster, Freeman, Watson & Cort
his Attorneys

UNITED STATES PATENT OFFICE.

JOHN W. MILAM, OF FRANKFORT, KENTUCKY.

TAKE-UP FOR FLEXIBLE SUSPENSORIES.

980,319.  Specification of Letters Patent.  Patented Jan. 3, 1911.

Application filed November 12, 1908.  Serial No. 462,334.

*To all whom it may concern:*

Be it known that I, JOHN W. MILAM, a citizen of the United States, and resident of Frankfort, Kentucky, have invented certain new and useful Improvements in Take-Ups for Flexible Suspensories, of which the following is a specification.

Figure 1:
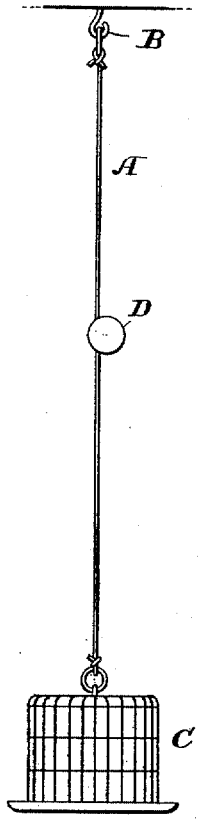
Figure 2:
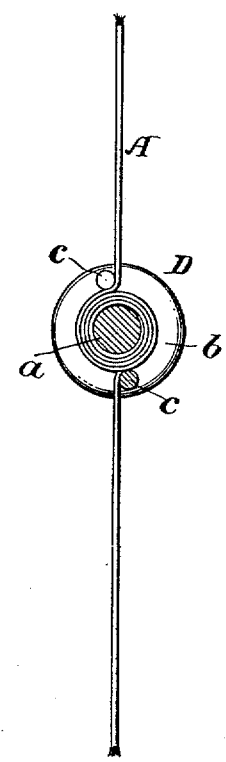
Figure 4:
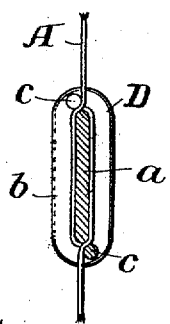
Figure 5:
Figure 3:
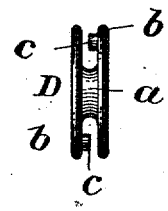

Flexible connecting strips or cords extending between fixed supports and movable objects, as table lamps, small motors, etc., or flexible suspensories for elevated objects, as electric bulbs, bird cages, etc., require frequent adjustment as to length, both to avoid the inconvenience of portions of the flexible connection being in the way, and for the purpose of supporting the movable objects at different heights. To enable the length of such flexible connections, whether suspensories or otherwise, to be increased or diminished between the fixed supports and the movable objects I combine with such connection a take-up device consisting of a core and separated side pieces, as fully set forth hereinafter and as illustrated in the accompanying drawing, in which:

Figure 1 is a view illustrating my device as applied to the suspensory of a bird cage; Fig. 2 is a sectional view of the device illustrating a means of preserving the connection in central alinement with the device; Fig. 3 is an edge view of Fig. 4; Fig. 4 is a section illustrating the device in a different form; Fig. 5 an end view of Fig. 6.

A represents a flexible connection attached to one end of a support B, and C represents the movable article to which the connection is attached at the other end. Said flexible connection may be a flexible cord or chain constituting a support for a bird cage as illustrated in Fig. 1, or it may be an electric conductor, the article to which it is attached being a bulb, or an electric motor, drill, or of any other character.

The take-up device D consists of a core $a$ and two connected cheeks or side pieces $b$, $b$, parallel and separated as shown. The surplus portion of the connection A between the support B and the article C is wound upon the core and the coils, thus laid one upon the other, are supported laterally on the core by the cheeks $b$, $b$, the number of windings depending upon the extent of material which is taken up.

Preferably the cheeks are close enough together to create a friction upon the cord or flexible connection sufficient to prevent the device from turning and traveling downward upon the cord, but this friction is not absolutely necessary for the device will remain in connection with the cord in any event after it descends into contact with the article to which the cord is attached, and the rotation of the device may be prevented by providing it with one or more lugs $c$ extending from the side of one of the cheeks. By providing two of such lugs as shown in Figs. 2 to 5, the cord may be carried to one side above and below the core so that the upper and lower portions of the cord or connection will be in alinement with the center of the core.

The core and cheeks may be circular as in Figs. 1 to 3, or substantially oblong, as shown in Figs. 4 and 5.

It will be seen that the flexible connection may be shortened by simply holding the device D in one hand while lapping the connection one or more times around the core, and on releasing the device it will remain in position upon the suspensory, and likewise, when it is necessary to extend the connection, this may be effected by simply uncoiling one or more of the coils that are wound about the core.

I claim as my invention:

1. A take-up for flexible connections consisting of a core adapted to receive coils of said connections, two parallel separated side pieces connected with the core, and a connection engaging lug formed on one of said side pieces and extending toward but spaced from the other side piece.

2. The combination with the flexible connection of a take-up device having a central core on which the connection is wound, parallel separated side pieces laterally supporting the coils wound upon the core, and a connection engaging lug connected to each one of said side pieces and extending toward but spaced from the other side piece.

In testimony whereof I affix my signature in presence of two witnesses.

JOHN W. MILAM.

Witnesses:
CHAS. R. CLAYTON,
HUEY F. LINDSEY.